United States Patent
Best

(10) Patent No.: US 11,906,397 B2
(45) Date of Patent: Feb. 20, 2024

(54) ACTIVE BACKLASH DETECTION METHODS AND SYSTEMS

(71) Applicant: Martin E. Best, Spartanburg, SC (US)

(72) Inventor: Martin E. Best, Spartanburg, SC (US)

( * ) Notice: Subject to any disclaimer, the term of this patent is extended or adjusted under 35 U.S.C. 154(b) by 0 days.

(21) Appl. No.: 17/701,979

(22) Filed: Mar. 23, 2022

(65) Prior Publication Data

US 2022/0214248 A1 Jul. 7, 2022

Related U.S. Application Data

(63) Continuation of application No. 16/690,278, filed on Nov. 21, 2019, now Pat. No. 11,385,139.

(60) Provisional application No. 62/770,227, filed on Nov. 21, 2018.

(51) Int. Cl.
| | |
|---|---|
| *G01M 99/00* | (2011.01) |
| *G01P 13/00* | (2006.01) |
| *G08B 5/36* | (2006.01) |
| *G08B 21/18* | (2006.01) |
| *H04N 25/75* | (2023.01) |

(52) U.S. Cl.
CPC .......... *G01M 99/005* (2013.01); *G01P 13/00* (2013.01); *G08B 5/36* (2013.01); *G08B 21/182* (2013.01); *H04N 25/75* (2023.01)

(58) Field of Classification Search
CPC .... G01M 99/00; G01M 99/005; G01M 13/00; G01P 13/00; G08B 5/36; G08B 21/182; G08B 21/187; H04N 25/75
See application file for complete search history.

(56) References Cited

U.S. PATENT DOCUMENTS

| | | | |
|---|---|---|---|
| 4,620,703 A | 11/1986 | Greenhut | |
| 4,853,913 A * | 8/1989 | Maeda | G11B 21/02 |
| | | | 369/43 |
| 4,914,370 A | 4/1990 | Sakamoto et al. | |
| 4,961,034 A | 10/1990 | Kakino et al. | |
| 5,343,132 A | 8/1994 | Iwashita | |
| 5,389,867 A | 2/1995 | Adachi et al. | |
| 5,691,616 A | 11/1997 | Iwashita | |
| 5,742,144 A | 4/1998 | Kato et al. | |
| 5,841,668 A | 11/1998 | Pahk et al. | |
| 5,910,090 A | 6/1999 | Taute | |
| 6,566,835 B1 | 5/2003 | Yoshida et al. | |
| 6,650,078 B1 | 11/2003 | Chaffee | |
| 6,701,212 B2 | 3/2004 | Shiba et al. | |
| 6,979,971 B2 | 12/2005 | Takamune et al. | |
| 7,182,427 B2 | 2/2007 | Tsuji et al. | |
| 7,204,168 B2 | 4/2007 | Najafi et al. | |

(Continued)

FOREIGN PATENT DOCUMENTS

WO   WO2016198099 A1   12/2016

OTHER PUBLICATIONS

Binh Khanh Dinh, Adaptive backlash compensation in upper limb soft wearable Exoskeletons, Available online Mar. 27, 2017, pp. 173-186. (Year: 2017).*

(Continued)

*Primary Examiner* — Tung S Lau
(74) *Attorney, Agent, or Firm* — Burr & Forman LLP; Douglas L. Lineberry

(57) ABSTRACT

Methods of and systems for actively detecting an increasing amount of backlash within a machine's mechanical power application to detect, predict, and estimate future mechanical failure.

9 Claims, 10 Drawing Sheets

(56) References Cited

U.S. PATENT DOCUMENTS

| | | | |
|---|---|---|---|
| 7,222,552 | B2 | 5/2007 | Kouno et al. |
| 7,278,501 | B2 | 10/2007 | Mori et al. |
| 7,292,954 | B2 | 11/2007 | Deller et al. |
| 7,409,882 | B2 | 8/2008 | Massimo et al. |
| 7,541,766 | B1 | 6/2009 | Sato et al. |
| 7,882,394 | B2 | 2/2011 | Hosek et al. |
| 7,935,876 | B1 | 5/2011 | West |
| 8,065,060 | B2 | 11/2011 | Danko |
| 8,265,779 | B2 | 9/2012 | Hagglund |
| 8,511,192 | B2 | 8/2013 | Hirtt et al. |
| 8,585,553 | B2 | 11/2013 | Park |
| 8,893,572 | B2 | 11/2014 | Wu et al. |
| 9,416,849 | B2 | 8/2016 | Park et al. |
| 9,815,161 | B2 | 11/2017 | Lin et al. |
| 9,933,055 | B2 | 4/2018 | Veres et al. |
| 2003/0036868 | A1 | 2/2003 | Yutkowitz |
| 2003/0056147 | A1 | 3/2003 | Yutkowitz |
| 2007/0299427 | A1 | 12/2007 | Yeung et al. |
| 2008/0269922 | A1 | 10/2008 | Tesar |
| 2009/0255137 | A1 | 10/2009 | Apkarian |
| 2012/0060745 | A1* | 3/2012 | Labat .............. F16K 37/0083 116/201 |
| 2014/0007441 | A1* | 1/2014 | Pettersson ............ G01B 5/008 33/503 |
| 2014/0018821 | A1 | 1/2014 | Yeung et al. |
| 2014/0046614 | A1 | 2/2014 | Pettersson |
| 2014/0197773 | A1* | 7/2014 | Ikai ............. G05B 19/404 318/630 |
| 2015/0297934 | A1 | 10/2015 | Agrawal et al. |
| 2016/0059412 | A1* | 3/2016 | Oleynik .............. A47J 36/321 700/250 |
| 2016/0288328 | A1* | 10/2016 | Bingham .............. G06Q 10/20 |
| 2017/0300033 | A1 | 10/2017 | Hashimoto et al. |
| 2017/0322626 | A1* | 11/2017 | Hawkes ................ A63F 13/28 |
| 2018/0036891 | A1* | 2/2018 | Monsarrat ............. B25J 13/085 |
| 2019/0184551 | A1* | 6/2019 | Shafer .................. B25J 9/102 |

OTHER PUBLICATIONS

Binh Khanh Dinh, et al., Adaptive Backlash Compensation in Upper Limb Soft Wearable Exoskeletons, Jun. 1, 2017, https://www.sciencedirect.com/science/article/pii/S0921889016303359.

C.U. Dogruer, et al., Active Vibration Control of a Single-Stage Spur Gearbox, Feb. 14, 2017, https://www.sciencedirect.com/science/article/pii/S0888327016303168.

Helen Durand, et al., Elucidating and Handling Effects of Valve-Induced Nonlinearities in Industrial Feedback Control Loops, Aug. 18, 2017, https://www.sciencedirect.com/science/a.

S. Ali A. Moosavian, et al., Backlash Detection in CNC Machines Based on Experimental Vibration Analysis, Jan. 1, 2008, https://pdfs.semanticscholar.org/e251/b57172340642eb30bb.

Tim Wescott, Controlling Motors in the Presence of Friction and Backlash, Apr. 14, 2016, http://www.wescottdesign.com/articles/Friction/friction.pdf.

Xiao Yang, et al., Modeling and Analysis of Steady-State Vibration Induced by Backlash in Servo Rotary Table, Jan. 1, 2015, https://link.springer.com/article/10.1007/s11465-015-0.

* cited by examiner

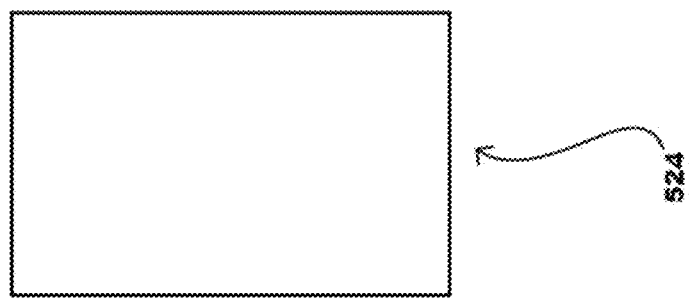
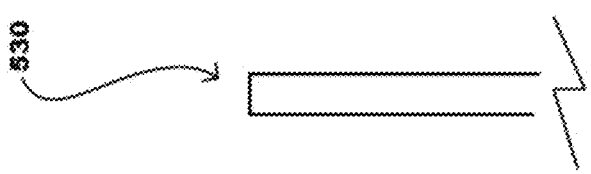
FIGURE 7
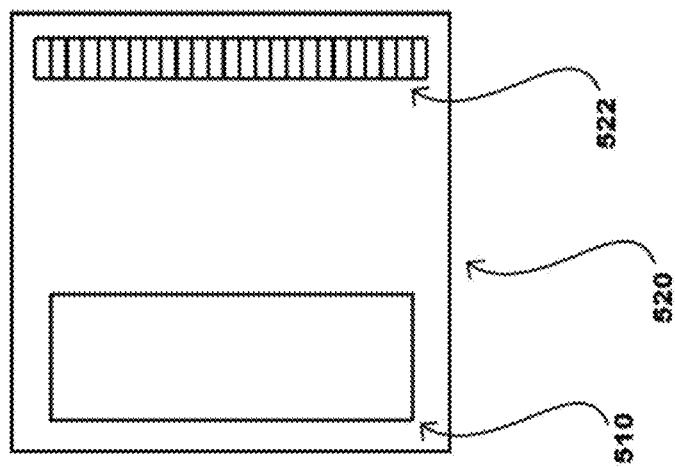

ACTIVE BACKLASH DETECTION METHODS AND SYSTEMS

BACKGROUND OF THE INVENTION

1) Field of the Invention

The present invention relates to methods of, and systems for, actively detecting an increasing amount of backlash within a machine's mechanical power application to detect, predict, and estimate future mechanical failure.

2) Description of Related Art

Continuous production process manufacturing necessitates reducing downtime while increasing production and output levels for firms to remain competitive. Production facilities have fewer hours to perform routine maintenance with the demands of ever-increasing output targets. Machinery utilized in a continuous production process typically operates for long periods before repairs and preventative maintenance can be completed. This makes routine maintenance, mechanical checks, and other preventative measures more difficult to perform. In addition, some applications introduce hazards associated with the performance of preventative maintenance that outweigh the cost associated with planned shutdown repairs. Regardless of the application situation and process environment, a method that detects increasing mechanical degradation of any mechanical power application is very desirable and advantageous. In addition, sensors that are utilized in actuator control systems are routinely contaminated by these continuously operating environments and introduce errors into the control system, which produces off quality, slower operating speeds, or downtime.

Actuators are components in machinery that are responsible for moving a controlling mechanism or other framework or system by applying force to move an output element. Actuators can also counteract mechanical energy, either kinetic or potential, exerted on a mechanism or system by applying force to prevent movement when stationary positioning is desirable. Various types of actuators exist to provide suitable force for a wide range of mechanical power applications by utilizing different forms of motive force such as hydraulic, pneumatic, electromechanical, electrical, or magnetic energy. Actuators use one or more of these various methods to transfer and/or convert a form of energy into a motive force that acts upon a secondary object by means of the actuator output element within the environment to perform work.

Backlash, sometimes called lash or play, is a clearance or lost motion in a mechanism caused by gaps between the parts. It can be defined as "the maximum distance or angle through which any part of a mechanical system may be moved in one direction without applying appreciable force or motion to the next part in mechanical sequence." Backlash eventually develops within mechanical systems, usually between the actuator mount and the actuator output element mount. In mechanical motion systems, backlash is the amount of play found between the movable parts, such as in a series of gears within a gearbox. Backlash can also be described as the play resulting from loose connections between gears or other mechanical elements such as mounts, shafts, bearings, gears, supports, pistons, mounting hardware, or other mechanical components that are responsible for the motive action in a mechanical power application.

An example, in the context of gears and gear trains, is the amount of clearance between mated gear teeth. It can be seen when the direction of movement is reversed and the slack or lost motion is taken up before the reversal of motion is complete. It can be heard from the railway couplings when a train reverses direction. Another example is in a valve train with mechanical tappets, where a certain range of lash is necessary for the valves to work properly. Backlash can have many causes. One of the major contributing factors is poor lubrication. In a well-built machine, backlash is minimized by design, but a certain amount may be present to allow for lubrication between the moving parts. If lubrication is not present, of poor quality or contaminated, then part friction will create undesired clearances which contributes to backlash. Another cause of backlash is poor manufacturing or raw materials, resulting in premature wear of parts within the mechanical power application drive train. Finally, backlash occurs in mechanical power applications as a result of normal component wear over an extended usage period.

Too much backlash in a system can cause many different types of failures. One example of failure is the destruction or loss of manufactured product, which is a waste of material and time. This is caused by the fact that the machine will no longer be as precise as it once was because there is now a loss of position accuracy as it moves in both directions. This loss will cause the machine to travel and to overshoot or undershoot its target position and create undesirable results in what it was designed to do. Other types of failures can be more dramatic such as gear slip and catastrophic mechanical failure.

As a mechanical system experiences prolonged use, the amount of backlash increases as the mounts, shafts, bearings, gears, supports, pistons, mounting hardware, and other mechanical components develop wear and/or become loose. Backlash is especially troublesome in mechanical power application systems that are responsible for high accuracy guiding, positioning, or synchronization because these systems continuously exert force in alternating directions. These continuously alternating motions of an actuator output element may include motions of forward and reverse, clockwise and counter-clockwise, or otherwise movement in all possible directions, which is in contrast to a typical motion control system that maintains constant speed in only one direction as in a typical conveyor line. This continuous cycling behavior greatly increases wear within a mechanical power application and accelerates the development of backlash. In guiding and positioning systems, the closed-loop control system can inherently compensate for small increases in backlash as the mechanical play increases; albeit at the cost of increased response time. In such systems backlash is difficult to detect due to the inherent capability of a closed loop or open loop controller to over-compensate for delayed positioning performance of an actuator controlled mechanical power application system where backlash is present. As a result, undetected backlash continues to increase unnoticed until complete failure of the mechanical motion system occurs.

Continuous production environments would greatly benefit from a method to actively detect backlash within machinery, especially when limited availability to conduct preventative maintenance is available. Prior attempts in backlash detection, e.g., Deller et al, U.S. Pat. No. 7,292,954, are primarily focused on initiating and applying a series of varying command profiles to an actuator controller in order to detect errors during a procedure to acceptance test an actuator before the mechanical power application is put into use, such as on an operating location of an aircraft prior to flight. Such a system introduces varying command profiles and measures the actuator output movement to insure the mechanical movement falls within tolerance levels deemed acceptable for the specific application. This type of test has a definite initiation and completion point and either passes or fails before normal operational of the actuator can begin.

Accordingly, it is an object of the present invention to provide a method and system for detecting increasing sensor contamination and hence signal degradation within a control system. Further, a method that synchronizes LED transmitter output with the image capture input of a CCD or CMOS sensor can greatly increase the lifespan of a LED light source transmitter. This allows for longer operation of machinery sensor systems before the need for replacement.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 7 shows one embodiment of a mechanical configuration of a light sensing embodiment of the current invention.

Figure 1:
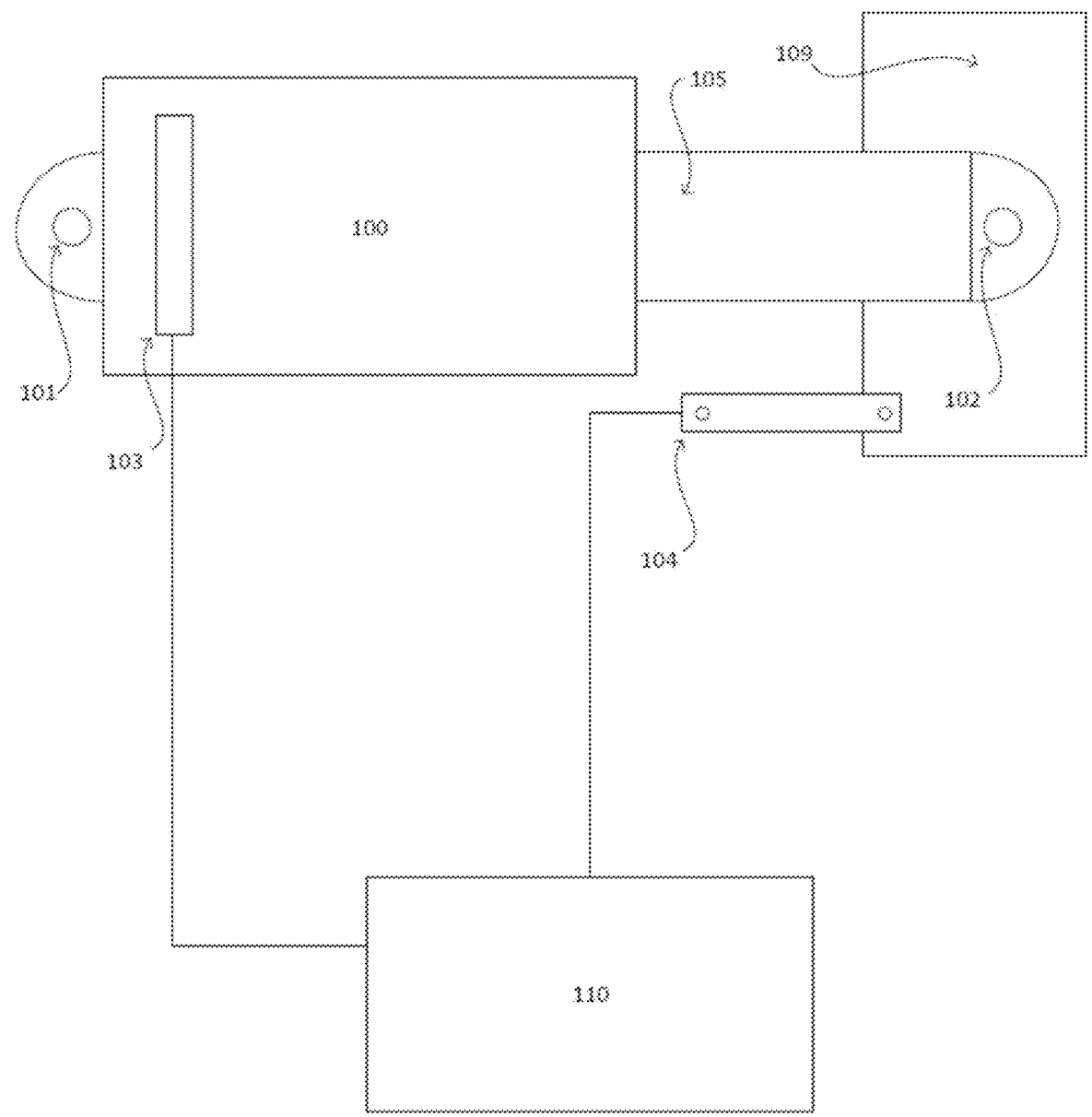
FIG. 1 shows a schematic design of the current system.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 2:
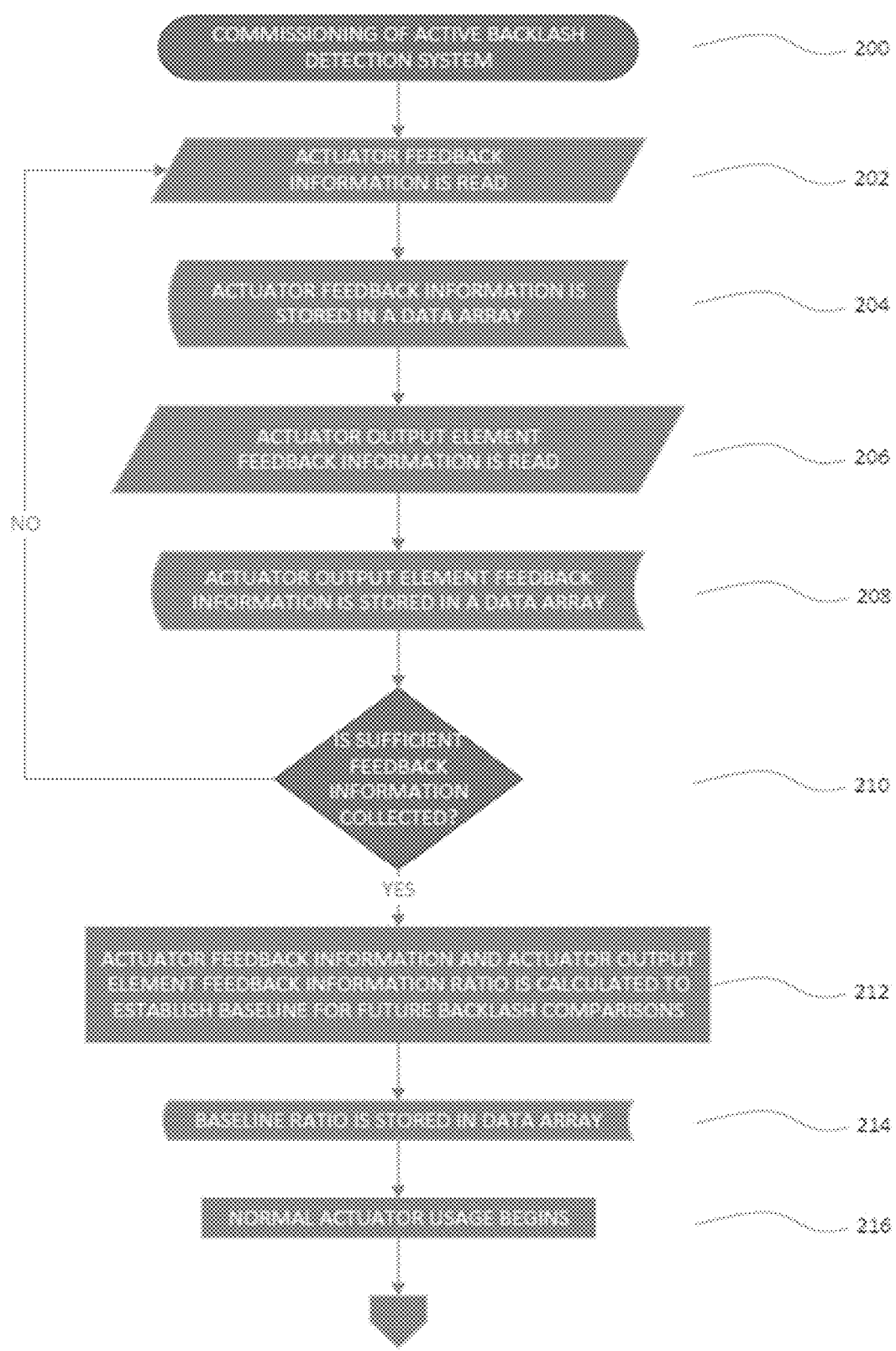
FIG. 2 shows an actuator feedback flow process of the commissioning process of the current disclosure.
Figure 3:
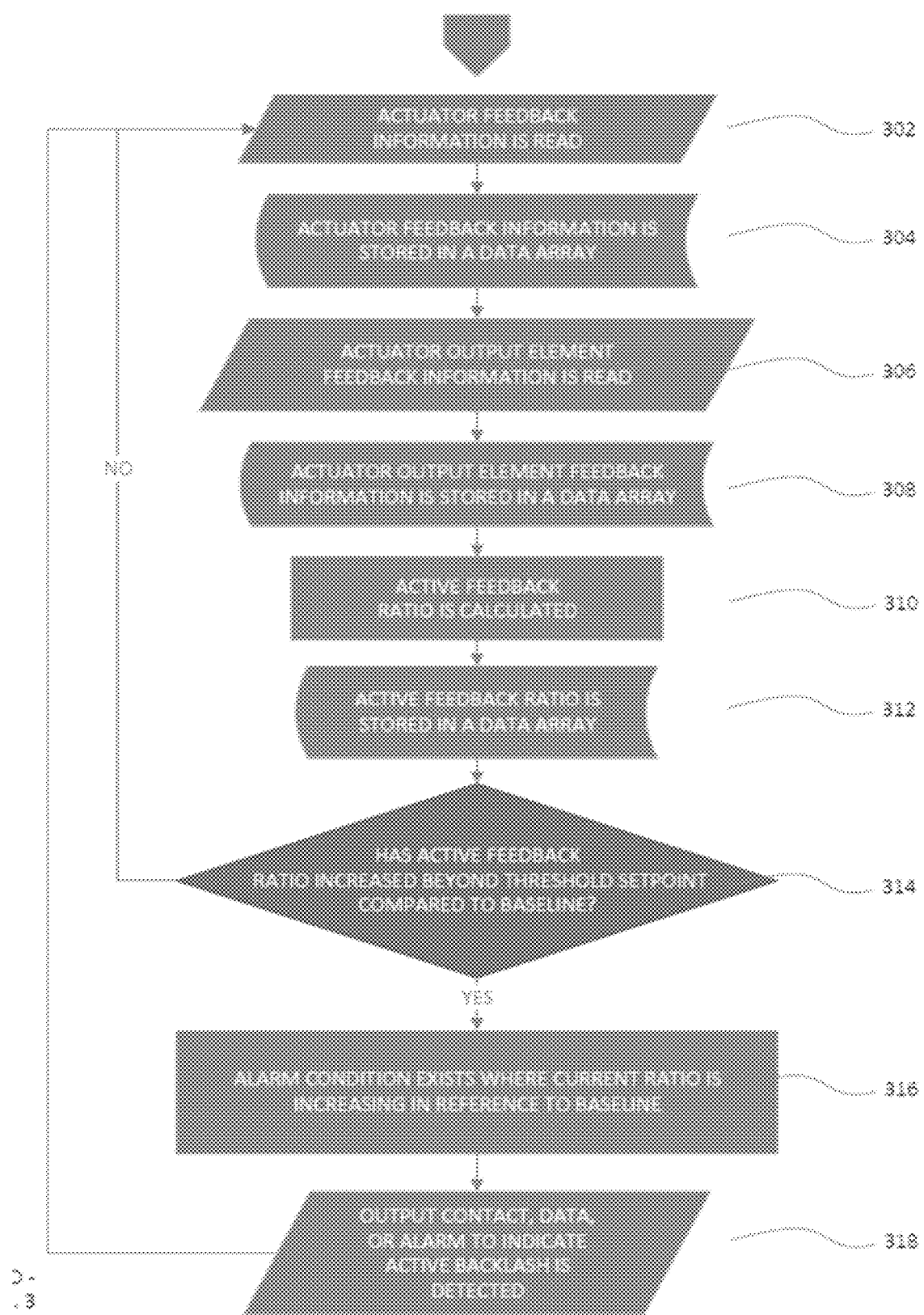
FIG. 3 shows an actuator feedback flow process during normal system operation.

The present disclosure actively detects backlash by continuously comparing baseline motion values collected and stored during commissioning of equipment with active motion values collected and stored during normal operation to detect an increasing ratio of variance between the baseline and current operating conditions to validate the current movement ratios are similar to those established during initial commissioning and calibration Referring to FIGS. 2 and 3, baseline motion values are those that are calculated 212 from values read 202 206 during commissioning 200~214 of the active backlash detection system. Baseline motion values are preferably established when the system is in a new condition or state, thereby providing a baseline for comparison against future active motion values. Active motion values are those that are calculated 310 from values read 302 306 during normal operation 302~318 of the active backlash detection system. Active motion values 310 are continuously calculated during normal operation and compared with the baseline motion values 212 calculated during commissioning of the active backlash detection system 200-214. The ratios of both the baseline motion value and the active motion value are derived from dividing the actuator feedback device readings with the actuator output element feedback device readings to establish a ratio during commissioning 212 and during normal operation 310.

One example would be actively detecting backlash in a precision guidance or positioning system used in a continuous production process. During initial installation and commissioning of the system, a baseline ratio value 212 related to at least two position feedback devices 103 104 is established and recorded 212 214 by reading the values of the actuator feedback device 202 that are stored in a data array 204 and by reading the values of the actuator output element feedback device 206 that are stored in a data array 208 and calculating a quotient by dividing the two 212. During normal operation, the system is in continuous use and therefore unavailable for routine backlash tests to establish the current state of mechanical integrity. Utilizing the present invention, the system will continuously and actively detect any increase in backlash between the two position feedback devices, which would result in a decrease in mechanical integrity, without the need for a specific acceptance test or validation test to be initiated.

This is especially useful in systems that experience continuous operation, such as with continuous production manufacturing machinery, where routinely stopping the equipment for mechanical integrity checks causes a disruption in the production process. This is also useful in systems where acceptance tests cannot be performed during normal operation, such as when an aircraft is in flight and cannot fully extend and retract actuators without causing flight disruption. Acceptance tests must be conducted when the aircraft is not in flight, whereas the proposed active backlash detection system can detect backlash at any time during operation. If the active ratio increases above the baseline ratio over a designated threshold, then backlash has been actively detected without any user intervention, thereby alerting personnel of a decrease in system integrity before mechanical failure occurs. The designated threshold is an adjustable value that can be set to adjust the sensitivity or trigger level at which point the system detects backlash 314. Present systems in the market rely upon a specific acceptance tests to be conducted before normal operation begins in order to test for positioning errors. If a mechanical failure occurs after this type of acceptance test is completed, the system will not detect the failure until after the initiation of the next test. The present invention continuously, uninterrupted during normal operation, and actively while the mechanical power application is in motion tests for increases in backlash and thereby provides a desirable, unique advantage in that equipment running for long periods of time can be continuously monitored for mechanical integrity and detect either a slowly increasing backlash or specific failure events, such as the immediate failure of a gear, bearing, bolt, or other hardware.

This is highly advantageous in continuous production environment systems because the detection method does not require a dedicated acceptance test procedure to be performed, which would interrupt normal production or operations. One example of a dedicated acceptance test is described in Deller et al., U.S. Pat. No. 7,292,954 B2 where a series of varying command profiles are initiated by the test system on an aircraft. The varying command profiles command the actuator system to move to specific positions and if the system does not resolve its target position within a pre-established range, the acceptance test fails. This test is initiated, as an example, before aircraft operation begins to insure all mechanical components are functioning within acceptable, pre-established standards or quality guidelines but does not continue during normal operation. Thus, this method only detects a lack of mechanical integrity after it has occurred and only during the acceptance test procedure. Instead, the present disclosure actively detects backlash throughout the lifespan of the mechanical power application through continuous monitoring and measuring of actuator movement information while continuously comparing these values to baseline information stored during actuator commissioning, which is preferable when the actuator is in a new and perfect mechanical condition. This method provides a way to validate the mechanical integrity of the actuator system between and including its mounting points to insure the system is continuing to perform within a tolerance value set within the controller.

In practice, actuators are typically controlled with either a preprogrammed command sequence, such as in the case of a robotic assembly system, or through the influence of outside environment variables, such as a material position that is detected by a sensor. Sensors within the operational environment detect the position of the material or product in production, a mechanical frame position related to the process, an operational control lever, or other environmental data input that relates to the process. As such, sensors must remain contaminate free in order to maintain a high level of sensing quality and system integrity. During normal operation, sensors begin to introduce errors into the actuator control system due to inaccurate measurements as a direct result of environmental contamination of the sensor transmitter or receiver elements. As a result, it would be advantageous for a method to detect an increasing amount of environmental contamination between a sensor transmitter and receiver, which can then be used to provide output to a controller to initiate a cleaning process to remove such contamination automatically when needed. Contaminants to the sensing system come in many forms, but are routinely seen in continuous production processes in the form of particles of the material being processed or manufactured. As an example, it is very common for lint to contaminate the sensor lens surface when used to detect the selvedge of many textile materials. Further, paper dust is a continuous problem contaminate for sensing systems utilized in the production of paper, corrugated paper board, and other products where paper is converted or produced. Other non-process contaminates may also obscure the sensor field of view, including stray light, glue used as part of a lamination process, or even moisture that accumulates on the lens surface as a result of the process of condensation. Any material that comes in between the sensor sensing element and the material being sensed may produce false readings and is hence considered a contaminant.

Such a system would record the sensor receiving element signal level during the commissioning process and compare this initial value with an average of a data array made up of continuously stored receiving signal values during normal operation. As the sensor receiving element value continues to degrade due to environmental contamination throughout normal operation, a controller can then trigger an output that initiates a cleaning process to remove contamination from either the sensor transmitter, receiver, or both. The sensor receiving element value degrades as environmental contaminants, such as lint or dust, accumulate on either the sensor, the light source, the reflector, or matte black background utilized in the sensing system. The cleaning process may be mechanical pressure applied to either surface or compressed air output provided through a pneumatic solenoid. In applications where an automatic sensor cleaning process is not possible, the output may instead alert maintenance personnel with a warning siren or light to clean the sensor transmitter or receiver manually as needed. Such a system is advantageous in a continuous production process by reducing the amount of machinery downtime and/or product defects.

In applications where control systems utilize a sensor with a light transmitter and light receiver, it is advantageous to maximize the light transmitter lifespan as much as possible. Typical lighting applications rarely require a continuous, uninterrupted light source, such as the light emitted from an incandescent filament bulb. Such light sources burn continuously and waste energy and lifespan compared to light sources that output light on a frequency, such as the pulsed output typical in a common fluorescent bulb powered by a ballast. Therefore, in applications where uninterrupted light is not required, it is advantageous to pulse the light output from the light source in order to provide light only when needed, thereby increases the lifespan of the light source.

Typical charge-coupled device (CCD) or complementary metal-oxide semiconductor (CMOS) sensor systems utilize a clocked trigger input to capture image information at a frequency necessary to support the particular application speed demands. The clocked trigger input is an input pin on vision system semiconductors, like CCD and CMOS semiconductors, that initiates a vision sample to be read by a central processing unit. The frequency for input varies with the demands of the application and is usually high enough to produce sufficient performance. This frequency is independent of the light transmitter frequency, if applicable, and therefore the light may be on and illuminating light when the sensor receiver element clocked trigger input is not active for the sensor to receive or capture images. As a result, the light source is emitting light when the CCD or CMOS sensor receiver cannot utilize the light. This wasteful use of the light source lifespan is eliminated by synchronizing the light source output frequency with the sensor receiver input of the CCD or CMOS sensor receiver. In this way, the light source is only producing output light when the sensor is triggered to sample input, thereby establishing a synchronized sampling only when the light is produce. In addition, this method increases the reliability and quality of the sensing system by insuring that every single image captured after the sensor receiver input is triggered will capture an exposure only when the light source element is active and emitting light.

With unsynchronized sensor transmitter and receiver systems, images can be triggered at the CCD or CMOS sensor during the off cycle frequency. As an example, a CCD or CMOS sensor receiver that operates on a clocked trigger from a dedicated CPU to capture images utilizing an unsynchronized light source will eventually capture an image during an off cycle of the light output. Examples of independently controlled sensor transmitter light sources would include a fluorescent light driven by a suitable ballast or an LED light source driven by a suitable output driver. Each operate at a frequency designated by their respective drivers, which is independent of the CCD or CMOS sensor receiver. As a result, light is emitted from an unsynchronized light source when the sensor receiver image capture input is not triggered at the CCD or CMOS receiver element, unnecessarily wasting the light source and its usable lifespan.

However, when LED light emission is precisely synchronized with the image capture trigger input clock frequency of a CCD or CMOS receiver, the LED is only powered and illuminated when needed by the sensor receiver element to capture an image. Integrating the LED transmitter-timing signal with a CCD or CMOS receiver image capture trigger would therefore greatly increase the lifespan of the LED transmitter by only requiring sensor light source transmitter illumination during the exact moment when an image capture process is engaged. Due to the demands placed on machinery and equipment in a continuous production process, and the cost associated with downtime and maintenance, increasing the lifespan of a critical sensor component is advantageous and desirable.

With respect to FIG. 1, aspects of the present invention include a controller 110 that measures, records, and stores the movement information signal of an actuator 100 by means of feedback device 103. In addition, the present invention simultaneously measures, records, and stores the movement information of the same actuator output element 105 during operation by means of feedback device 104. Such movement information is provided by commonly available motion, positioning, or movement sensors 103 and 104 suitable for the actuator type and application including but not limited to rotational encoders, linear encoders, absolute encoders, linear resistors, or any other form of motion feedback device that will produce an output when motion occurs that is suitable for an electronic controller to input and measure.

The device performing the feedback function may be mounted directly to the portion of the actuator 100 responsible for creating motion of the output element 105 is feedback device 103. This feedback device may be mounted internally or externally to the actuator, so long as it is in motion when the portion of the actuator creating movement to produce movement at the actuator output element 105 is also in motion. The device performing the feedback function that is mounted to either the actuator output element 105 or the device 109 that is being acted upon by the actuator output element 105 is feedback device 104. Feedback devices 103 and 104 may be independently mounted so that a difference between these two feedback devices can be realized as backlash developing at a point between any mechanical components from actuator mount 101 to actuator output element mount 102. In a preferred embodiment, feedback device 104 may be mounted on one side to the device that actuator output element 105 is acting upon through mount 102 and the other side of feedback device 104 to be mounted to a fixed location that is stationary at all times during normal operation.

FIG. 2 shows a feedback flow process of the current disclosure. Controller 110 may be commissioned 200 after mechanical installation is complete to begin measuring the motion of actuator 100 through feedback devices 103 and 104. During commissioning 200, actuator feedback information is read 202 from motion feedback device 103 and stored in a first data array 204 within the memory of controller 110. In addition, feedback information is read 206 from the actuator output element 105 through motion at feedback device 104 and stored in a second data array 208 within the memory of controller 110. This process continues until sufficient feedback information 210 is received from feedback devices 103 and 104. It is important to note that process 202 and 204 may occur after process 206 and 208 and the same results will be achieved irrespective of the order of operation of feedback device information input and storage. Thus, feedback information may be read from 104 and then 103 and the same results will be realized after the ratio is calculated. Sufficient feedback information 210 will vary depending on the specific application due to variables such as gearbox ratios, lever arm lengths, or other mechanical aspects of the entire system in addition to the types of feedback devices used in positions 103 and 104 as well as other factors that may affect efficient detection of backlash.

After sufficient feedback information is received 210 then the controller 110 calculates a ratio 212 between the values received by feedback devices 103 and 104, and this baseline ratio is stored 214 within controller 110. At this point, normal operation 216 of the system begins. During normal operation of the system, actuator feedback information is read 302 from motion feedback device 103 and stored in a first data array 304 within the memory of controller 110. In addition, feedback information is read 306 from the actuator output element 105 through motion at feedback device 104 and stored in a second data array 308 within the memory of controller 110. Then a ratio is calculated 310 using information from both feedback devices 103 and 104 and stored in a data array 312. It is important to note that process 302 and 304 may occur after process 306 and 308 and the same results will be achieved irrespective of the order of operation of feedback device information input and storage. Thus, feedback information may be read from 104 and then 103 and the same results will be realized after the ration is calculated.

Next, the calculated ratio 310 that is stored 312 within controller 110 is compared to the baseline ratio 212 that is stored 214 within controller 110 to determine if the amount of backlash, if any, between the actuator mounts 101 and 102 has increased beyond a threshold set point value stored within controller 110 since the baseline ratio 212 calculation was performed. If the active feedback ratio 310 stored in memory 312 within controller 110 has increased beyond the threshold set point value stored within controller 110 in comparison to the calculated baseline ratio 212 stored in memory 214, then backlash has been actively detected 314 and it is reasonable to ascertain that degradation of the actuator, the actuator output element mechanism, the actuator mounts, and/or other components between the actuator mounts 101 and 102 are developing backlash. At this point, an alarm condition exists 316 and various forms of output 318 will be initiated from controller 110 depending upon the demands of the application, available technology, configuration of the controller 110, or preferred method of external notification (i.e. emergency stop the machine, sound a siren, activate an alarm light, alert maintenance personnel, notify management, send an electronic mail, send a mobile message, etc.).

If the active feedback ratio 310 stored in memory 312 within controller 110 has not increased beyond the threshold set point value stored within controller 110 in comparison to the calculated baseline ratio 212 stored in memory 214, then backlash has not been detected 314 and the actuator feedback information read loop continues another cycle of reading actuator feedback again 302. The continuation of this loop by failing to meet the condition of active feedback ratio increasing beyond the threshold set point compared to baseline 314 is validation that the actuator system is still performing with the same ratio established between both feedback devices 103 and 104 during the initial commissioning and calibration of the actuator system, plus or minus the threshold value set in controller 110.

The present disclosure may be installed and operate on a wide range of devices utilizing an actuator system, with or without external sensor influence. This includes production processes, continuous formation processes, assembly lines, etc. The system could be installed on any system containing an actuator 100 and responsible for positioning an object 109 that is connected to the actuator output element 105. One example would be the case of a guidance or positioning system responsible for accurately adjusting a frame that is responsible for directly affecting a web position in a continuous production process. In this case, a position feedback device 103 is coupled to the actuator prime element responsible for producing motion and a position feedback device 104 is coupled to the frame responsible for acting upon the web in question. Position feedback device 103 would be directly coupled to the armature within a direct current motor, the rotor within an alternating current motor, or the piston within a cylinder. The output element of the motor, motor gearbox, lever, rod, shaft, or other mechanical power application would then be responsible for providing sufficient motive force at the actuator output element 105 to adequately impact the device it is couple to 109 and thereby sensed by position feedback device 104. The present invention would then monitor the actuator movement with feedback device 103 and the object being acted upon 109 via the output element 105 to actively detect backlash between the actuator prime element 100 and the device frame being acted upon 109. A second example would be installing a position feedback device 103 onto the rotational actuator within a crane actuator mechanism responsible for acting upon the rotex gear and then installing a position feedback device 104 on the crane framework being acted upon by the rotex gear. In this case, the system can detect increasing backlash between the actuator and the crane member being acted upon by the rotex gear. This system may be utilized to detect backlash within a system whose actuator is either directly coupled to the object 109 being acted upon the actuator 100 or in a system where various gear reducers, gearboxes, or other ratio inducing mechanical power applications are utilized to increase or decrease force or speed through an actuator output element 105.

Figure 4:
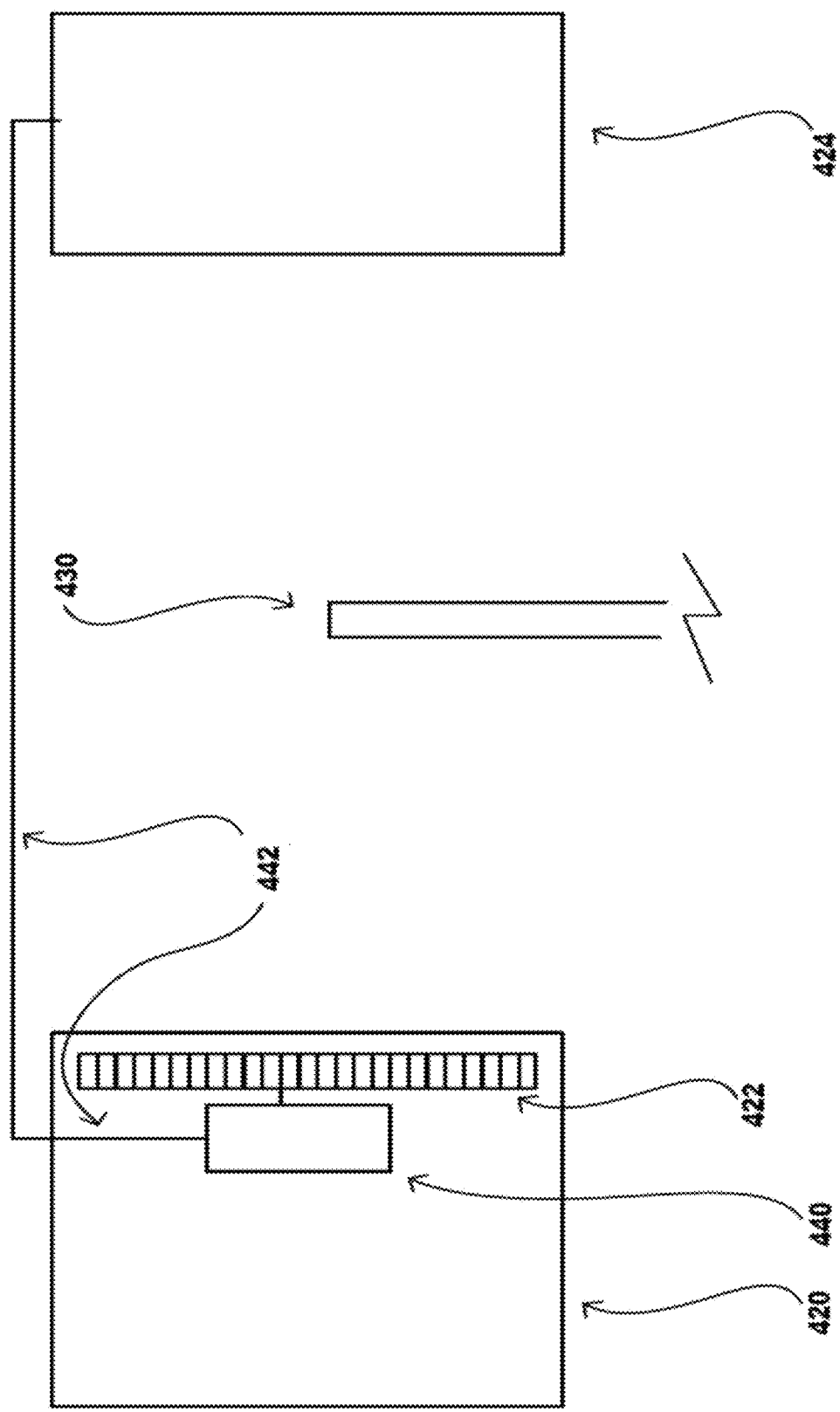
FIG. 4 shows one embodiment of a mechanical configuration of the current disclosure.
Figure 5:
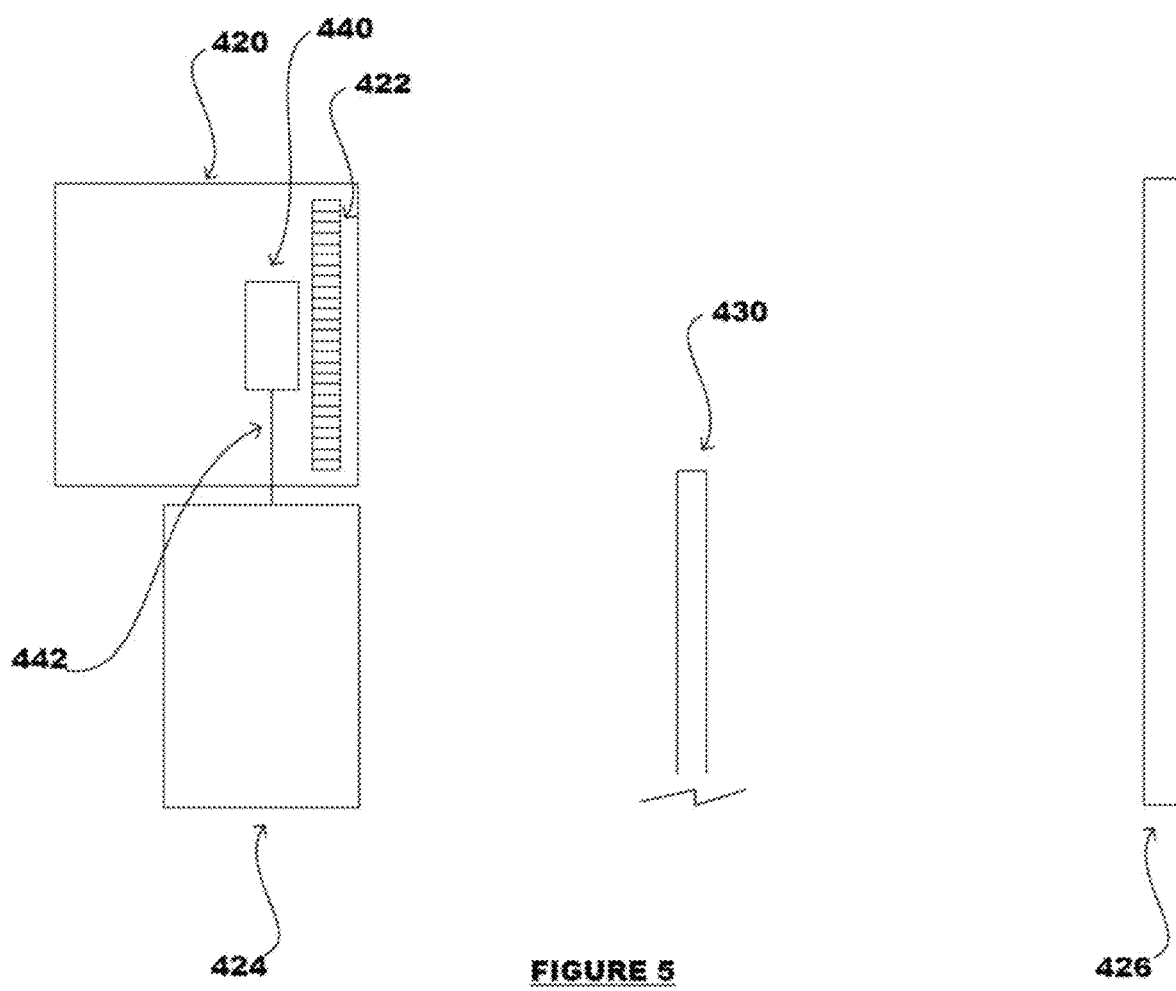
FIG. 5 shows an alternate embodiment of a mechanical configuration of the current disclosure.
Figure 6:
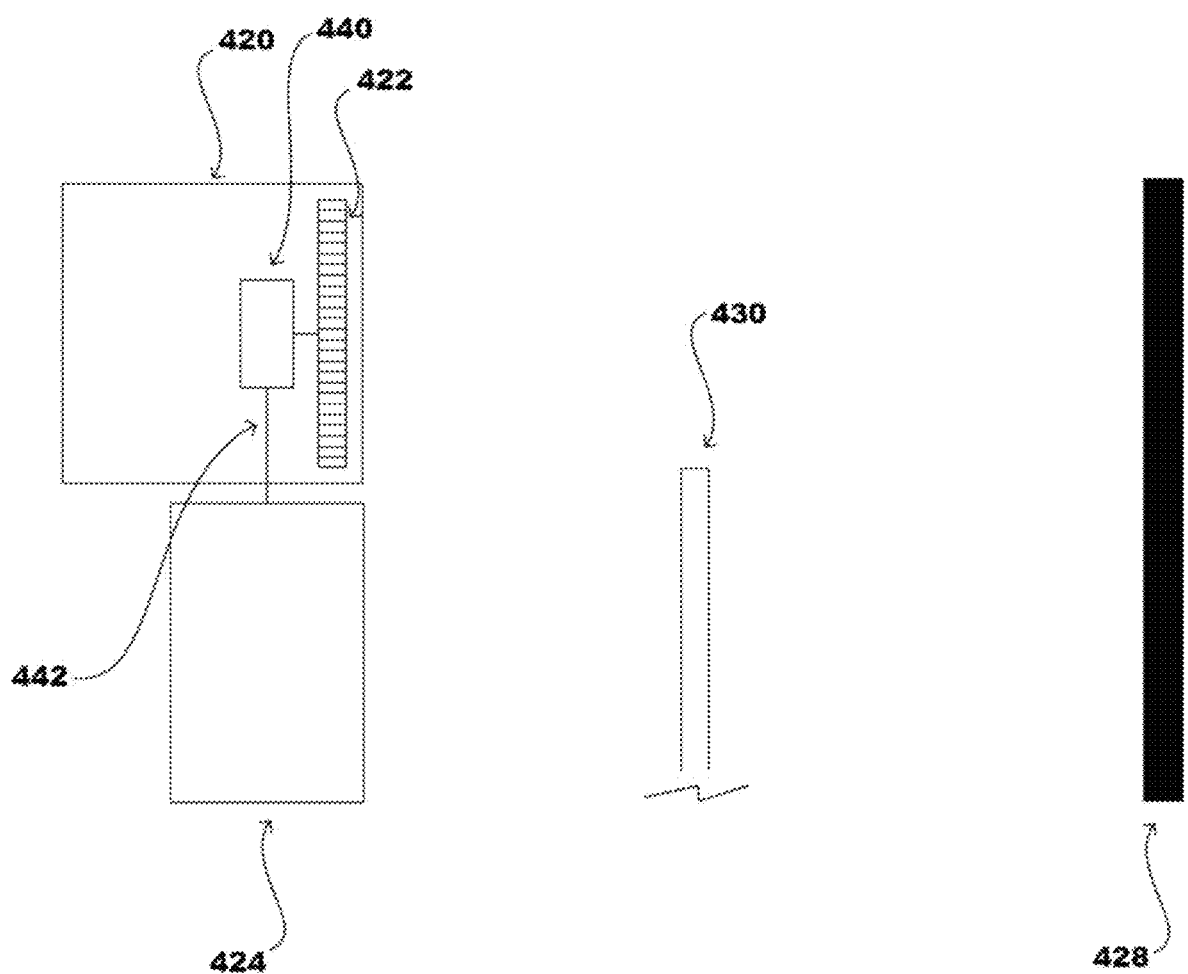
FIG. 6 shows a further alternate embodiment of a mechanical configuration of the current disclosure.

In a further embodiment, aspects of the present disclosure include a method to synchronize a LED light source transmitter element 424 with the input cycle of an image sensor receiver element 422 through controller 440 that measures and evaluates the read out of sensor receiver element 422 mounted within sensor 420. The controller 440 may be integrated within the housing of the sensor 420 or the controller 440 may be located external to the sensor housing 420. The sensor 420 and LED light source transmitter element 424 may be assembled or constructed in various mechanical configurations including, but not limited to, examples as seen in FIGS. 4-6 depending on the environment, application demands, or engineering requirements.

The digital image sensor receiver element 422 may be constructed of various available media technology types including, but not limited to, charge-coupled devices (CCD), complementary metal-oxide semiconductors (CMOS), N-type metal-oxide semiconductors (NMOS), or any digital image sensor that provides the capability to measure a varying light intensity level at individual pixel locations within the image sensor array. Further, the LED light source transmitter element 424 may be incorporated within the sensor housing 420 depending on the environment, application demands, or engineering requirements and may operate in any visible and/or nonvisible frequency depending upon the needs of the application. The image sensor receiver element 422 within sensor 420 operates on a clock frequency established by a microprocessor based controller 440 that triggers the receiver element 422 to read out all pixel level values within the image sensor receiver array. The LED light source transmitter 424 is triggered by controller 440 through a wire conductor 442 to produce a light output that is received by the receiver element 422 for a sufficient duration and intensity to properly expose all pixels within the array of the imaging sensor. The LED light source transmitter 424 is activated at the same moment and therefore synchronized with the image sensor receiver element 422 read out gate pulse generator input so that the light source is only activated and producing light output when absolutely needed for a proper exposure. This greatly reduces the amount of time the LED array within the LED light source transmitter 424 is required to be activated and illuminating light, thereby increasing the lifespan of the light source transmitter 424.

One example of such a system would be a CCD sensor utilized to monitor the edge of a material in a continuous production process, for instance, to measure the web width. The sensor receives light from the light source 424, which exposes the sensor receiver element 422 within the sensor housing 420. The sensor receiver element 422 must receive light in order to detect a contrast from light to dark or dark to light produced by the material 430 being sensed. In typical applications, the light source 424 is free to operate at its own frequency, irrespective of the clock frequency of controller 440 that triggers the receiver element 422 to read out all pixel level values. Further, conventional light sources are designed to operate at a minimum frequency set well above the flicker fusion threshold, which is the frequency at which an intermittent light stimulus appears to be completely steady to the average human observer. The human flicker fusion threshold is usually between 60 and 90 hertz, so conventional light sources operate at a frequency much greater than this to appear flicker-free to the average human. As a result, a conventional fluorescent light or LED light operates well above 60 hertz. However, when the light source 424 output frequency is regulated and synchronized by the controller 440 that triggers the input process at the sensor receiver element 422, the frequency of the light can be greatly reduced. This, as an example, results in a light operational frequency much lower than that of a traditional system tuned to operate above the flicker fusion threshold. This greatly increases the light source lifespan, reduces maintenance, limits downtime, and results in a functional system more reliable than when using light sources that are not synchronized to the strobing input of the sensor receiver element 422. In the above mentioned web width sensing system, the finite lifespan of the light source will be increased on an order of magnitude when synchronized with the operational frequency of the sensor receiver element 422 in comparison to a conventional light source operating above the flicker fusion threshold.

Figure 8:
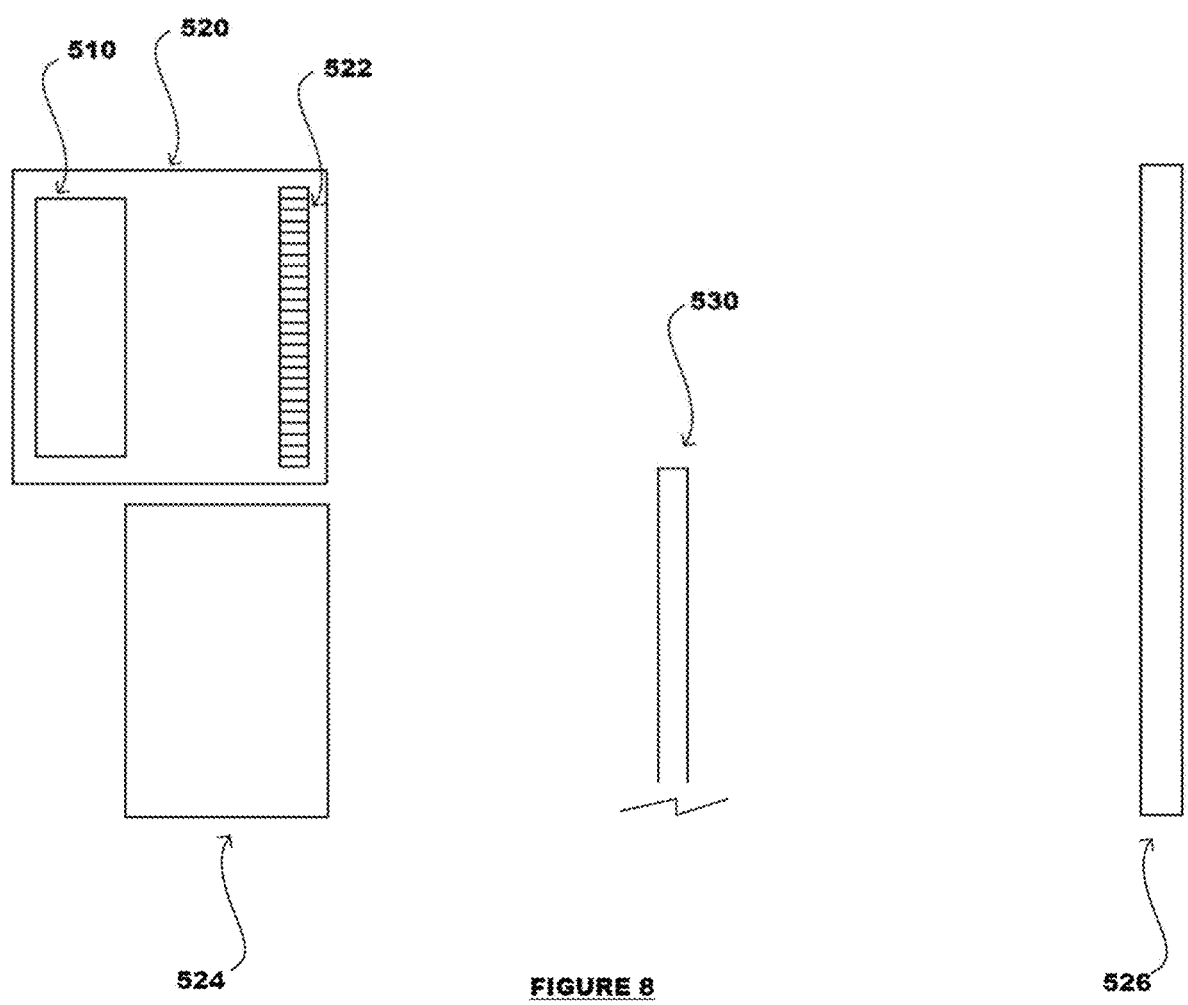
FIG. 8 shows an alternate embodiment of a mechanical configuration of a light sensing embodiment of the current invention.
Figure 9:
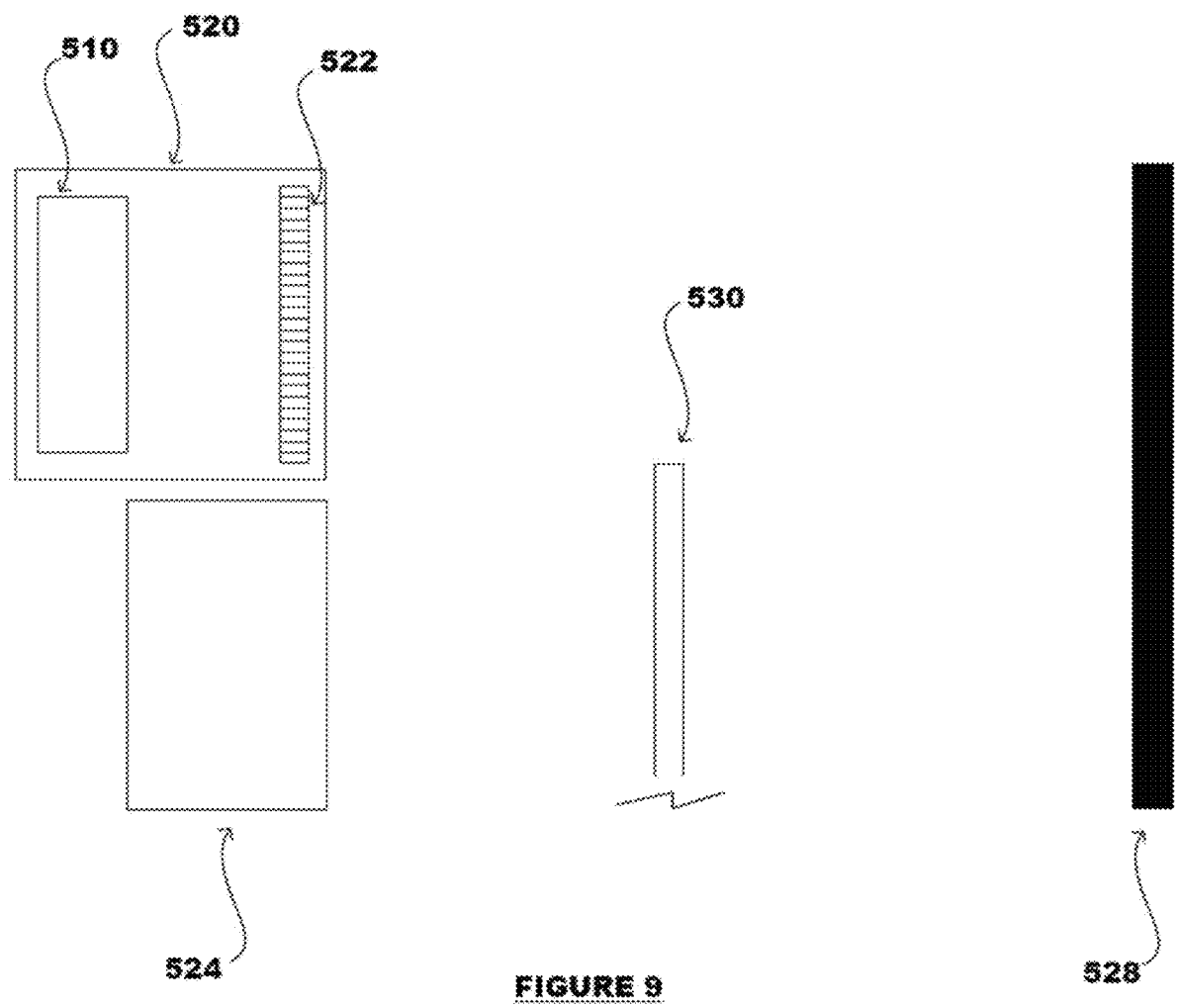
FIG. 9 shows a further alternate embodiment of a mechanical configuration of a light sensing embodiment of the current invention.
Figure 10:
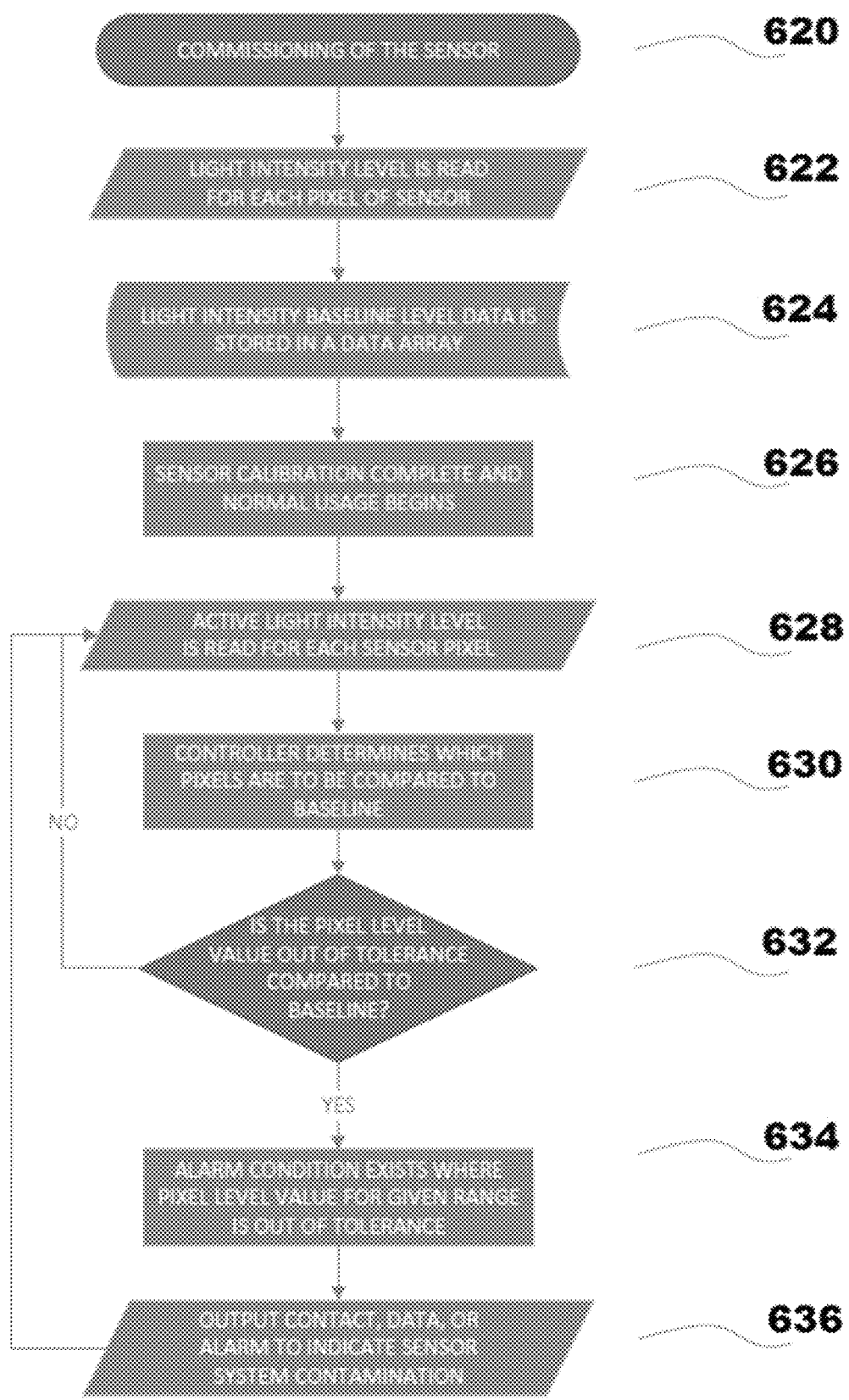
FIG. 10 shows a flow chart of a Sensor Contamination Detection system (SCD) of the current disclosure.

In a further embodiment, aspects of the present invention include a controller 510 that measures, records, and stores the receiver signal of a sensor 520 that consists of a digital image sensor receiver element 522 during commissioning 620, see FIG. 10, in order to compare light levels after commissioning to detect sensing system contamination 632. Controller 510 may be integrated within the housing of the sensor 520 or the controller 510 may be located external to the sensor housing 520. The sensor 520 and light source transmitter element 524 may be assembled or constructed in various mechanical configurations including, but not limited to, examples as seen in FIGS. 7-9 depending on the environment, application demands, or engineering requirements. The digital image sensor receiver element 522 may be constructed of various available media technology types including, but not limited to, CCD, CMOS, NMOS, or any digital image sensor that provides the capability to measure a varying light intensity level at individual pixel locations within the image sensor array. Further, the LED light source transmitter element 524 may be incorporated within the sensor housing 520 depending on the environment, application demands, or engineering requirements and may operate in any visible and/or nonvisible frequency depending upon the needs of the application.

After mechanical installation, the sensor 520 is calibrated via the controller 510 to measure, record, and store the value of each pixel intensity level with no obstructions between the receiver element 522 and the transmitter element 524 when configured in a back lit mode application as seen in FIG. 7 where the object being detected 530 is situated between the receiver 522 and the transmitter 524 after calibration.

Sensor 520 may also be calibrated via controller 510 to measure, record, and store the value of each pixel intensity level with no obstructions between the receiver element 522 and the reflector 526 when configured in a front lit mode application as seen in FIG. 8 where the object being detected 530 is situated between the receiver 522 and the reflector 526 after calibration.

Sensor 520 may also be calibrated via controller 510 to measure, record, and store the value of each pixel intensity level with no obstructions between the receiver element 522 and the matte black background 528 when configured in a front lit mode application as seen in FIG. 9 where the object being detected 530 is situated between the receiver 522 and the matte black background 528 after calibration.

During calibration and commissioning 620 of the sensor 520, a routine as shown in FIG. 10 is processed that measures the light intensity level at each pixel 622 within the receiving element 522 when no obstructing object or material 530 is present. During this commissioning and calibration process, the light intensity level is read from each pixel 622 of the sensor 520 receiver element 522 and these values are stored 624 in a data array within the memory of the controller 510. These values serve as a baseline for the light intensity level of the light source transmitter 524, reflector 526, or matte black background 528 when the system is in a new or otherwise optimal condition. After these values are stored 624 in the controller 510 then the calibration and commissioning process for determining the baseline values is complete and normal operation of the system can begin 626.

During normal operation, the light intensity level of each pixel within the sensor 520 receiving element 522 is read by the controller 510. The controller 510 determines 630, which pixels are to be considered the object being detected 530 or either the light source transmitter 524, reflector 526, or the matte black background 528 depending upon the application and sensor configuration. When the object material being sensed 530 is present, a portion of the pixels within the image sensor array within sensor receiver element 522 are in an electrically high state, while the remaining portion of the pixels within the array are in an electrically low state. In either a frontlit or backlit application system, environmental contamination can accumulate on the light transmitter 524 which can reduce the light intensity level received by the sensor receiver element 522. In such a case, the controller 510 can begin to receive incorrect signal information in regards to the position of the object material being sensed 530 as well as either the reflector 526, or matte black material 528 used as a contrasting edge relative to the material being sensed 530.

In the case of the backlit application as seen in FIG. 7, the pixels that are triggered high due to exposure of light from the transmitter element 524 will be considered the light source and the pixels that are triggered low due to lack of exposure of light from the transmitter element 524 due to obstruction by the object material being sensed 530 will be considered the material being sensed 530. The controller 510 will then compare the pixels that are considered to be those from the light source transmitter 524 to the same range of pixels previously stored in the baseline array 624 during calibration commissioning to determine if those pixel level values are out of tolerance compared to a threshold value stored in controller 510. If the active pixel array range is out of tolerance compared to the baseline values stored for the same range during calibration commissioning, then the system identifies this as an alarm condition 634. During the alarm condition 634 the controller 510 will then activate an output contact, data, or alarm to indicate sensor contamination is present between the sensor receiver element 522 and the light source transmitter 524. This output may alert personnel, activate a cleaning mechanism to remove the contamination present, or perform other actions as required for the particular application.

In the case of the front lit application as seen in FIG. 8, the pixels that are triggered high due to exposure of the light from the transmitter element 524 that is reflected by reflector 526 will be considered the light source and the pixels that are trigger low due to the lower exposure of light from the transmitter element 524 due to obstruction by the object material being sensed 530 will be considered the object material being sensed. The controller 510 will then compare the pixels that are considered to be those from the light source transmitter 524 reflected from the reflector 526 to the same range of pixels previously stored in the baseline array 624 during calibration commissioning to determine if those pixel level values are out of tolerance compared to a threshold value stored in controller 510. If the active pixel array range is out of tolerance compared to the baseline values stored for the same range during calibration commissioning, then the system identifies this as an alarm condition 634. During the alarm condition 634 the controller 510 will then activate an output contact, data, or alarm to indicate sensor contamination is present between the sensor receiver element 522 and the matte black background 528 illuminated by light source transmitter 524. This output may alert personnel, activate a cleaning mechanism to remove the contamination present, or perform other actions as required for the particular application.

In the case of the front lit application as seen in FIG. 9, the pixels that are triggered low due to a lower exposure of light from the transmitter element 524 that is reflected by the matte black background 528 will be considered the matte black background 528 and the pixels that are triggered high due to exposure of the light from the transmitter element 524 reflecting off the object material being sensed 530 will be considered the object material being sensed. If the pixel array range that is triggered low and considered the matte black background 528 is out of tolerance compared to the baseline values stored for the same range during calibration commissioning, then the system identifies this as an alarm condition 634. During the alarm condition 634 the controller 510 will then activate an output contact, data, or alarm to indicate sensor contamination is present between the sensor receiver element 522 and the matte black background 528 illuminated by light source transmitter 524. This output may alert personnel, activate a cleaning mechanism to remove the contamination present, or perform other actions as required for the particular application. The output 636 continues until the tolerance level is satisfied 632 when comparing the baseline pixel values to the current pixel values.

One example of the above referenced frontlit system is a sensing system utilized to detect reference lines on a preprinted material which is used to guide a slitting system in reference to the preprinted line, irrespective of the material edge position. This form of guiding system is needed in an application where a preprinted material is laminated or combined with another material, as in a preprinted bottom liner mated with singleface corrugated paper board. In this application, the guiding criteria is the preprinted line instead of the outside edge of the material because the lamination process may not align perfectly with the preprinted image. As a result, a frontlit sensing system is required to detect the line, irrespective of the edge, to position the downstream slitting system based on the preprinted line and not the edge of the material, which may weave depending upon the quality of the upstream lamination process. In this application, the sensor must be positioned in the application as in FIG. 9 where both the light source 524 and sensor 520 are on the same side of the material being sensed 530, with the matte black background 528 used as the contrasting edge. In this application example, contamination of the sensing system can include material buildup on either the light source 524, the sensor 520, or the matte black background 528.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A system for detecting backlash in a device comprising:
a controller;
an actuator, wherein the controller measures, records and stores a movement information signal from the actuator;
an actuator output element;
at least one feedback device that measures, records, and stores movement information of the actuator input element; and
at least one movement sensor for detecting movement information of the actuator output element;
wherein the system is configured to:
determine a calibration movement ratio for a device with respect to at least two parts in the device;
collect baseline motion values for the at least two parts in the device during use;
measure baseline motion values for the at least two parts in the device during use;
collect active motion values for the at least two parts in the device;
measure active motion values for the at least two parts in the device;
compare the measured baseline motion values to the active motion values;
compute a ratio of variance between the measured baseline motion values and the active motion values; and
compare the calculated ratio of variance to the calibration movement ratio.

2. The system of claim 1, wherein the feedback device is mounted directly to either the actuator or a device acted upon by the actuator output element.

3. The system of claim 1, wherein at least a first feedback device and at least a second feedback device are employed wherein the first and second feedback devices are mounted independently of one another.

4. The system of claim 3, wherein the first feedback element is mounted on an area of the device that the actuator output element is acting upon and the second feedback element is mounted to a fixed location.

5. The system of claim 1, wherein a ratio of variance between a measured baseline motion value of the actuator output element and an active motion value of the actuator output element is calculated.

6. The system of claim 1, wherein comparing the calculated ratio of variance to the calibration movement ratio occurs continuously.

7. The system of claim 6, wherein the device is in use when the comparing the calculated ratio of variance to the calibration movement ratio occurs.

8. The system of claim 1, wherein when the ratio of variance between the measured baseline motion values and the active motion values increases beyond a set threshold an alert is issued that backlash has occurred.

9. The system of claim 1, wherein no dedicated acceptance test procedure is performed on the device.

* * * * *